(12) United States Patent
Bonn

(10) Patent No.: US 8,313,645 B2
(45) Date of Patent: Nov. 20, 2012

(54) FILTER DEVICE

(75) Inventor: Heinz Bonn, Kreuzau-Winden (DE)

(73) Assignee: Larox Oyj, Lappeenranta (FI)

( * ) Notice: Subject to any disclaimer, the term of this patent is extended or adjusted under 35 U.S.C. 154(b) by 239 days.

(21) Appl. No.: 12/592,995

(22) Filed: Dec. 7, 2009

(65) Prior Publication Data
US 2010/0163476 A1    Jul. 1, 2010

Related U.S. Application Data

(63) Continuation of application No. PCT/EP2008/056735, filed on Jun. 2, 2008.

(30) Foreign Application Priority Data

Jun. 8, 2007  (DE) .......................... 10 2007 027 035

(51) Int. Cl.
*B01D 25/32* (2006.01)
*B01D 25/00* (2006.01)

(52) U.S. Cl. ......... 210/225; 210/224; 210/227; 210/231
(58) Field of Classification Search .................. 210/224, 210/225, 227, 228, 231
See application file for complete search history.

(56) References Cited

U.S. PATENT DOCUMENTS 3,988,242 A    10/1976  Kurita et al.
4,235,721 A *  11/1980  Nakamura et al. ............ 210/227

FOREIGN PATENT DOCUMENTS

| DE | 29 08 880 A1 | 9/1979 |
|---|---|---|
| EP | 0 978 304 A | 2/2000 |
| JP | 05 103914 A | 4/1993 |
| JP | 06 091111 A | 4/1994 |

* cited by examiner

Primary Examiner — Nam Nguyen
Assistant Examiner — Madeline Gonzalez
(74) Attorney, Agent, or Firm — Von Rohrscheidt Patents

(57) ABSTRACT

The invention relates to a filter device comprising at least one filter chamber (7) configured between a chamber side (5) and a membrane side (6) of two parallel filter plates (1) and divided through two filter cloths (4), the membrane sides (6) of the two filter plates (1) each comprising a membrane (3), an outlet (8), and a deviation element (12) attached to the outlet (8) and penetrating the membrane (3). When the filter device is closed, a suspension containing a solid substance can be inducted between the filter cloths (4) in such a way that a filtrate penetrates the filter cloths (4) on the chamber side (5) and on the membrane side (6), while the solid substance is deposited in a filter cake on the filter cloths (4). The filtrate flows initially substantially parallel to the filter cloth (4) towards the outlet (8), is deviated through the deviation element (12) in an outlet direction (9) perpendicular to the filter cloth (4), and flows out through the outlet (8). When the filter device is open, the filter plates (1) are at a distance from each other, so that the filter cloths (4) with the filter cake can be removed from the filter chamber (7). In order to avoid loss of tightness of the filter device, a sealing edge (16) of the deviation element (12) is flush with the membrane in a sealing manner.

2 Claims, 3 Drawing Sheets

Filtrate flow straight straight through filter cloth into outlet without deviation Boss portion (10a) fitted into expressing sheet 3, but not into base plate (2)

FILTER DEVICE

RELATED APPLICATIONS

This application claims priority from, and incorporates by reference, International patent application PCT/EP2008/056735, filed on Jun. 2, 2008 and German patent application DE 10 2007027035.8, filed Jun. 8, 2007.

FIELD OF THE INVENTION

The invention relates to a filter device that prevents leaks and more particularly to a filter device that prevents leaks where a sealing edge of the deviating element is flush with a membrane in a sealing manner.

BACKGROUND

The invention relates to a filter chamber configured between a chamber side and a membrane side of two parallel filter plates and divided through two filter cloths, the membrane sides of the two filter plates each include a membrane, an outlet, and a deviation element attached to the outlet and penetrating the membrane, wherein a suspension containing a solid substance can be inducted between the filter cloths when the filter device is closed, so that a filtrate penetrates the filter cloths on the chamber side and on the membrane side, while the solid substance is deposited in a filter cake on the filter cloths. The filtrate flows initially substantially parallel to the filter cloth towards the outlet, is deviated through the deviation element in an outflow direction perpendicular to the filter cloth, and flows out through the outlet, and wherein the filter plates are at a distance from each other when the filter device is open, so that the filter cloths with the filter cake can be removed from the filter chamber.

Filter devices are known such as shown in JP 06091111 A. As a technological background, furthermore, filter devices with said arrangement of a plurality of filter plates as plate stacks and filter chambers configured between two respective filter plates lying on top of one another or standing next to one another are known e.g. from DE 32 22 987 A1, DE 32 22 988 A1 and DE 199 05 674 C1. The filter cloth and a rubber elastic membrane are disposed in the filter chambers essentially in the respective separation plane between the filter plates, which are disposed adjacent to one another.

During operation of such filter devices, a suspension to be filtered is supplied under pressure to the filter chambers and pressed through the filter cloth. Thus, the solid content of the suspension accumulates on the filter cloth as a filter cake. The filtered suspension, from which the solid content has been purged, flows as a filtrate below the filter cloth and through the outlet and out of the filter chambers essentially without pressure.

Through loading the outlet with a washing medium, e.g. water, the filter cake can be flushed subsequently. After the filtration process is completed, the pressure medium cavity on the membrane side of the filter chamber is loaded with air as a pressure medium or e.g. with water. In turn, the filter cloth then presses the liquid out, which has remained in the filter cake. Through loading the outlet with air, the filter cake can be dried subsequently.

The membrane includes a circumferential edge bead, which lies in a groove in the filter plate enclosing the filter chamber on the membrane side during the operation of the filter device. The filter chamber and the base of the filter chamber configured in the filter plate on the membrane side essentially cover the same surface, so that the edge bead is supported on the filter plate with the filter chamber closed.

During filtration operation of the known filter device, the out flowing filtrate is deviated into the outlet through the deviation element. Thus, the filter cloth, which is pressed onto the membrane on the side of the membrane, does not penetrate the outlet configured at this location during the filtering process.

Furthermore, also the washing medium and drying air are run through the outlet into the filter chamber under pressure after the filtering is completed. The deviation element of the known filter device prevents that washing medium and drying air impact the filter cloth with high velocity perpendicular or substantially perpendicular, and that the filter cloth is substantially shot through and strongly worn overall, like in the filter devices known from the technological background, in particular by solid particles comprised of deposits in the filtrate channel and transported in the drying air.

The seal rim of the membrane extending in the membrane about the outlet and the recess configured at this location comprises a certain amount of flexibility due to its material and can be positioned only with difficulties in the known filter device in the filter plate with the required tolerance. The known filter device therefore typically has leaks at this location during operation.

SUMMARY OF THE INVENTION

An aspect of the invention is to prevent leakages of a filter device.

Another aspect of the present invention is to provide a filter device including at least one filter chamber arranged between a chamber side and membrane sides of two parallel filter plates and divided by two filter cloths. The membrane sides of the two parallel filter plates each include a membrane, an outlet and a deviation element attached to the outlet and penetrating the membrane. When the filter device is closed, a suspension containing a solid substance can be introduced between the filter cloths in such a way that a filtrate penetrates the two filter cloths towards the chamber side and towards the membrane sides, while the solid substance is deposited in a filter cake on the two filter cloths, the filtrate flows first substantially parallel to the two filter cloths towards the outlet, is deviated by the deviation element in an outflow direction perpendicular to the two filter cloths, and flows through the outlet. When the filter device is open, the filter plates are at a distance from each other such that the filter cloths can be removed with the filter cake from the filter chamber. The deviation element is arranged self-locking in the zo outlet and a spout of the deviation element is fitted into the outlet. A cover plate of the deviation element may cover a plurality of outlet slots leading on the membrane side to the outlet. The deviation element may be configured self-locking in the outlet and a spout of the deviation element is fitted into the outlet.

BRIEF DESCRIPTION OF THE DRAWINGS

The invention will be described in detail with reference to the following drawings, in which like reference numerals refer to like elements, wherein.

DETAILED DESCRIPTION

Based on the known filter device, it is proposed according to the invention that the deviation element is flush with a seal rim of the membrane in a sealing manner. Thus, the deviation element stabilizes the seal rim of the membrane. The deviation element is advantageously made of a solid plastic material, like e.g. PP, keeps the outlet cross section open and simultaneously deviates the flow direction of the fluid flowing respectively during filtering operation, e.g. during flushing and drying of the filter cake, without loading the filter cloth. The portion of the wall of the deviation element, which substantially causes the flow deviation and which at least partially protrudes beyond the outlet in the interior of the filter chamber, furthermore prevents that the outlet is plugged by the filter cloth during filtering operation. The edges of the deviation element are embedded in the membrane and in particular do not generate any resistance against removing the filter cloth after the filtering operation.

In another embodiment, a cover plate of the deviation element of a filter device according to the invention covers a plurality of outlet slots leading to the outlet on the membrane side. This cover plate also prevents an obstruction of the outlet slots leading to the outlet through the filter cloth and forming so-called cake fingers known from the prior art.

The deviation element is advantageously mounted in a filter device according to the invention, so it is self-locking. Thus, the assembly and disassembly of the deviation element is particularly simple.

Furthermore, a spout of the deviation element is advantageously fitted into the outlet of a filter device according to the invention. Such a deviation element cannot change its position transversal to the outlet direction during filtering operation.

Figure 1:
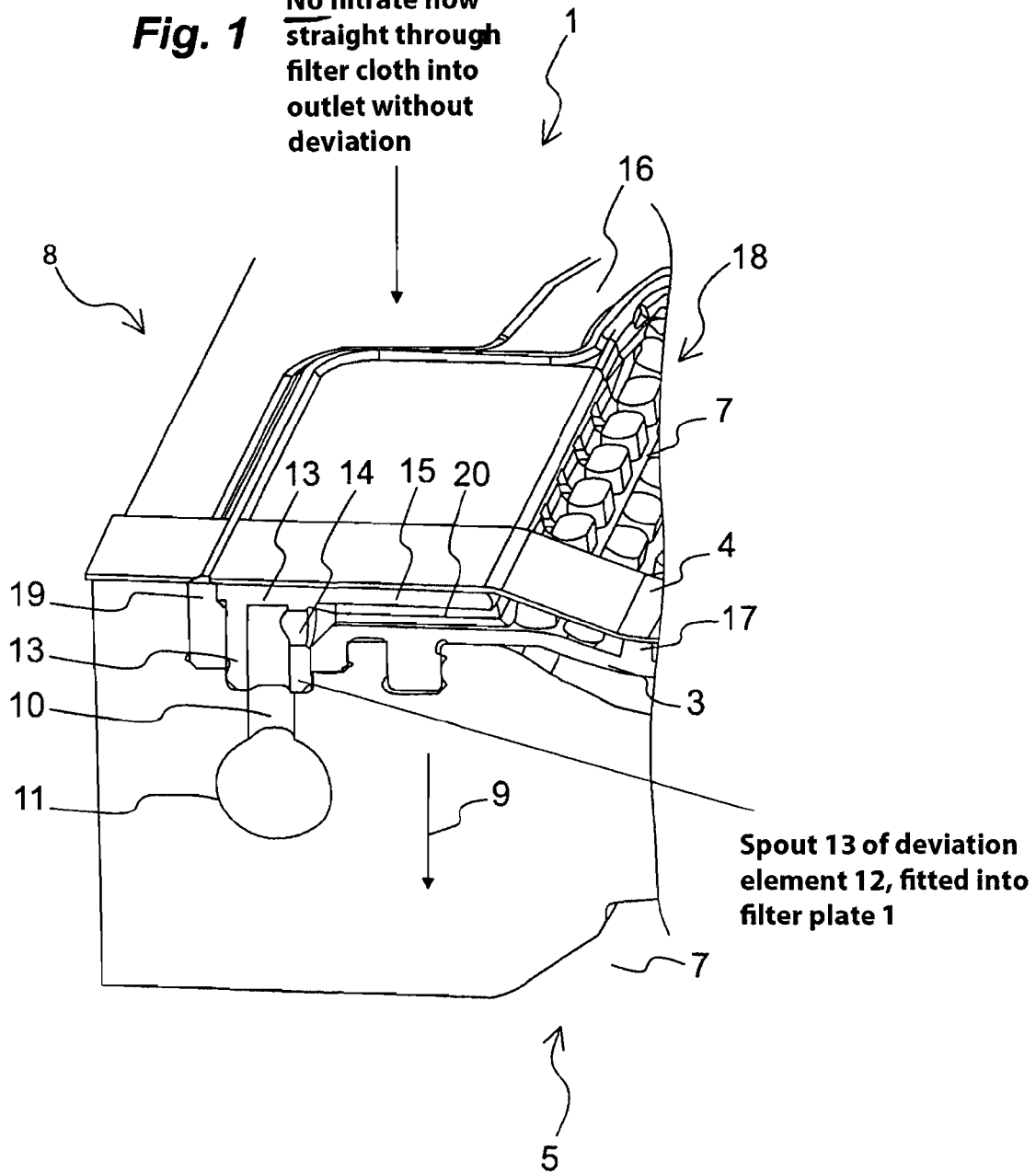
FIG. 1 illustrates a filter plate of a filter device in a sectional view.
Figure 2:
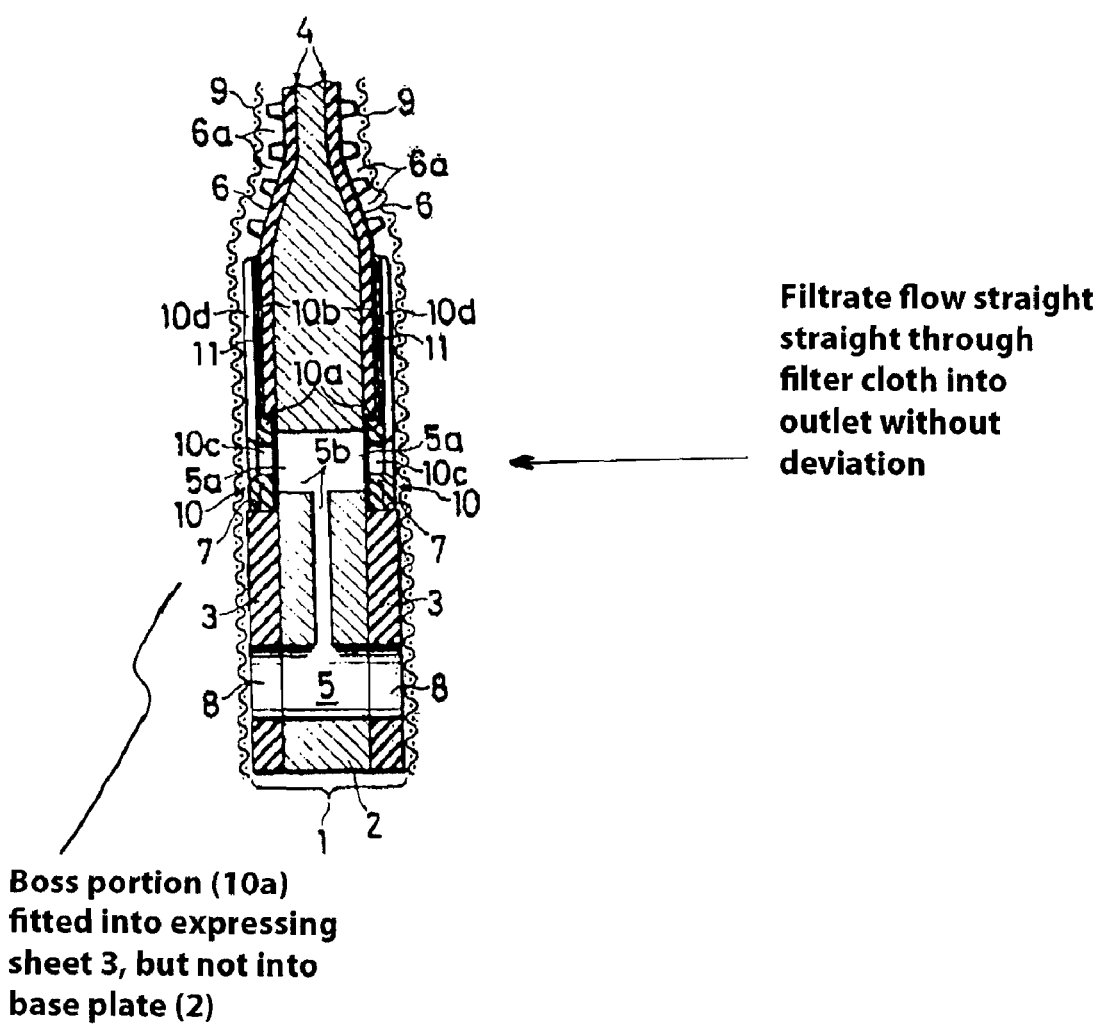
FIG. 2 illustrates the plate packet of the filter device in a sectional view.

A plurality of filter plates 1 made of PP, as they are illustrated in FIG. 1 in detail, can be supported in a steel frame of a filter device according to the invention. In the operating position of the filter device, the filter plates 1 are vertically aligned and compressed in a press frame to form a plate packet 2. A rubber membrane 3 and two filter cloths 4 are disposed substantially in the separation plane between respective adjacent filter plates 1. The filter device according to the invention, the frame and the press frame are not illustrated. FIG. 2 illustrates a sectional view of the plate packet 2 of the filter device according to the invention.

Each filter plate 1 includes a chamber side 5 and a membrane side 6 of two filter chambers 7, which are created respectively through a combination with identical filter plates 1 in the plate packet 2. Each filter plate 1 includes an outlet 8 on the membrane side 6 outside of the filter chamber 7, which outlet includes nine tubular outlet channels 10 extending parallel to one another in an outlet direction 9 perpendicular to the separation plane, which outlet channels lead still in the filter plate 1 into a collector 11, which extends parallel to the separation plane and which is also configured tubular.

Figure 3:
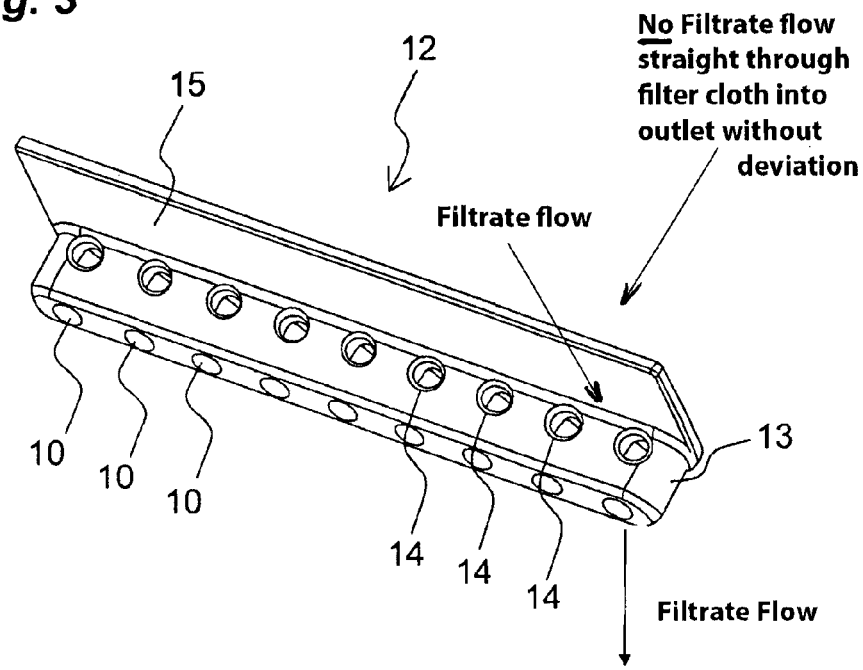
FIG. 3 illustrates a deviation element of the filter device.

The filter plate 1 is provided with a deviation element 12 illustrated in detail in FIG. 3, which is fitted into the outlet 8 with a spout 13. In the spout 13, the outlet channels 10 are initially extended opposite to the outlet direction 9 and lead respectively into inlet openings 14 aligned in parallel to one another and in parallel to the separation plane, wherein a cover plate 15 reaches over the inlet openings.

Figure 4:
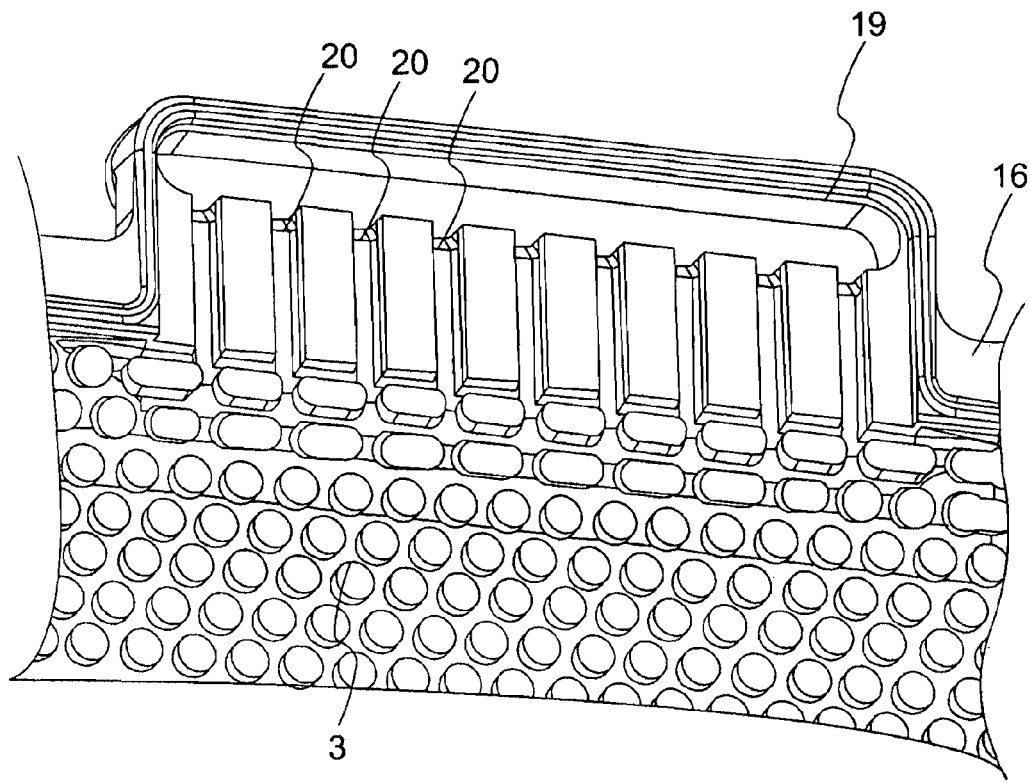
FIG. 4 illustrates a membrane of this filter device.

The deviation element 12 is flush in a sealing manner with a seal rim 16 of the membrane 3 illustrated in FIG. 4 in the operating position of the filter device. The spout 13 is fitted into a collar 19 configured at the membrane 3 and into the outlet 8 of the filter plate 1 and retained self-locking in both.

During filtering operation of the filter device, a suspension loaded with a solid content is inducted respectively between the filter cloths 4 into the filter chambers through an inlet which is not shown. During filtering operation, the filtrate initially permeates the filter cloth 4 towards the filtrate side 17 of the filter cloths 4 and flows substantially without pressure from the filter chamber 7 on the membrane side 6 through open outlet slots 20 configured in the membrane 3 into a respectively associated inlet opening 14 into the deviation elements 12 and into the outlet 8. The solid content of the suspension thus accumulates as a filter cake (not shown) on the cake side 18 of the filter cloths 4.

The deviation element 12 is pressed into the collar 19 of the membrane 3 for assembling the filter device according to the invention. Disassembly is performed e.g. with two wide screw drivers or with simple assembly levers.

The deviation element 12 protects the outlet slots 20 against penetration by the filter cloth 4 due to positive chamber pressure, so that the outlet cross section of the outlet slots 20 is kept open for the outgoing filtrate or kept open in opposite direction for inflowing washing medium or inflowing air. The flow direction of the washing medium and of the drying air is deviated in the deviation element 12 and the filter cloth 4 is saved. Furthermore, a more uniform flow distribution is established in the entire filter chamber 7 during washing and drying, which significantly shortens these process steps and significantly reduces the amount of fluid required.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS 1 filter plate
2 plate pack
3 membrane
4 filter cloth
5 chamber side
6 membrane side
7 filter chamber
8 outlet
9 outlet direction
10 outlet channel
11 collector
12 deviation element
13 spout
14 inlet opening
15 cover plate
16 seal rim
17 filtrate side
18 cake side
19 collar
20 outlet slot

What is claimed is:
1. A filter device comprising:
at least one filter chamber arranged between a chamber side and a membrane side of two parallel filter plates and divided by two filter cloths,
wherein the membrane sides of the two parallel filter plates each include a membrane, an outlet and a deviation element attached to the outlet and penetrating the membrane, wherein the deviation element includes inlet openings oriented substantially parallel to the filter plates and outlet channels oriented substantially perpendicular to the filter plates, when the filter device is closed, a suspension containing a solid substance is introducible between the filter cloths so that a filtrate penetrates the two filter cloths towards the chamber side and towards the membrane side, while the solid substance is deposited in a filter cake on the two filter cloths, the filtrate flows first substantially parallel to the two filter cloths towards the outlet, is deviated by the deviation element in an outflow direction perpendicular to the two filter cloths, and flows through the outlet, and when the filter device is open, the filter plates are at a distance from each other such that the filter cloths can be removed with the filter cake from the filter chamber, wherein the deviation element is arranged self-locking in the outlet of the filter plate and a spout of the deviation element is fitted into the outlet of the filter plate, wherein the deviation element closes the outlet of the filter plate in a direction perpendicular to the filter plate towards the filter cloth.

2. A filter device according to claim 1, wherein a cover plate of the deviation element covers a plurality of outlet slots leading on the membrane side to the outlet.

* * * * *